D. F. CHAMBERS.
END THRUST BALL BEARING.
APPLICATION FILED OCT. 5, 1910.

1,011,028. Patented Dec. 5, 1911.

Witnesses
Donald H. Stewart.
E. V. Webster

Inventor
David F. Chambers
By Dowell & Dowell
his Attorneys

UNITED STATES PATENT OFFICE.

DAVID F. CHAMBERS, OF LANCASTER, PENNSYLVANIA, ASSIGNOR TO THE STAR BALL RETAINER COMPANY, OF LANCASTER, PENNSYLVANIA, A CORPORATION OF NEW JERSEY.

END-THRUST BALL-BEARING.

1,011,028.  Specification of Letters Patent.  Patented Dec. 5, 1911.

Application filed October 5, 1910. Serial No. 585,439.

*To all whom it may concern:*

Be it known that I, DAVID F. CHAMBERS, a citizen of the United States, residing at Lancaster, in the county of Lancaster and State of Pennsylvania, have invented certain new and useful Improvements in End-Thrust Ball-Bearings, of which the following is a specification.

This invention relates to ball bearings, and more particularly to ball retainers or cages for confining balls in separated relation for resisting pressure or end-thrust while permitting free rotation of the balls in all directions.

The invention consists essentially of an annular ball retainer or cage adapted to surround an axle or support and hold a series of balls which project therefrom in opposite directions for resisting pressure or end-thrust; the retainer being composed of an annular disk or plate having a series of apertures therein and marginal flanges extending therefrom in opposite directions; said apertures being adapted to receive the balls and said flanges being adapted to prevent said balls from escaping, without preventing free rotation of the balls.

The invention will first be hereinafter more particularly described, with reference to the accompanying drawings, which are to be taken as a part of this specification, and then pointed out in the claims at the end of the description.

Figure 1:
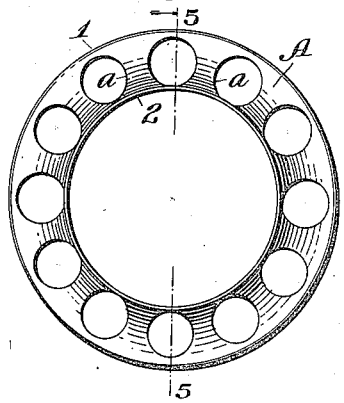
Figure 2:
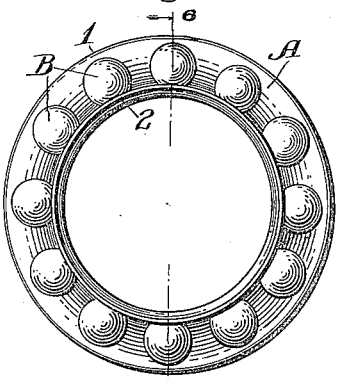
Figure 3:
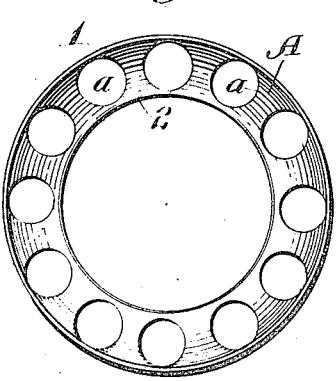
Figure 4:
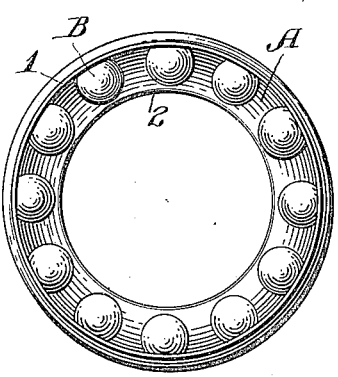
Figure 5:
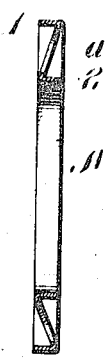
Figure 7:
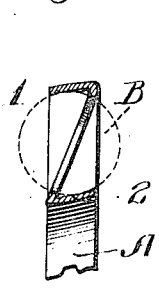
Figure 6:
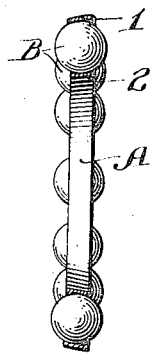

Figures 1 and 2 of said drawings represent side elevations of my improved ball retainer without and with balls therein respectively, Fig. 1 showing the inner marginal flange extending in the plane of the axis of the ring to permit the insertion of the balls, and Fig. 2 showing the balls inserted and retained by swaging or bending the inner flange or margin thereof toward the balls; Figs. 3 and 4 are views similar to Figs. 1 and 2, showing the opposite side of the retainer. Fig. 5 is a transverse section of the device taken on line 5—5 of Fig. 1; Fig. 6 is a transverse section taken on line 6—6 of Fig. 2; and Fig. 7 is a detail sectional view.

Referring to said drawings, in which the same reference letters are used to denote corresponding parts in different views, the letter A denotes a flat circular plate or disk having a central opening and oppositely projecting marginal flanges 1, 2, and a series of apertures *a*, therein, adapted to receive spherical rollers or balls B which project therefrom in opposite directions for resisting pressure or end-thrust. The flanges 1, 2, extend substantially in the plane of the axis of the ring less than one-half the diameter of a ball, and in the finished structure are slightly inclined or turned inwardly for confining the balls. The flange 1 on the outer margin or periphery of the annulus extends therefrom in an opposite direction to the flange 2, and the annular plate or ring A bridges the space between the two flanges at an angle thereto, uniting one edge of one flange to the opposite edge of the other flange, so that when the balls are inserted they may be retained by slightly inclining, swaging or bending said flanges toward the balls. For convenience in inserting the balls, either the outer or the inner flange may be initially formed at an inclination to the axis of the ring, and the balls being entered in the openings from the opposite side, are then secured in the spaces provided for their reception by swaging or bending the other flange or margin thereof in the opposite direction to that of the initially inclined flange.

The device can be stamped out of a flat strip of metal or other suitable material and perforated to receive the balls. One of the flanges having been first bent or inclined to prevent the balls from escaping at that side on which it is located, the device may be filled with balls after which the other flange may be similarly bent or inclined to retain the balls at that side, and the device then may be handled as a unit with the assembled balls, and may be readily placed in position surrounding a central axis or support to adapt the balls to resist axial pressure or end-thrust without preventing free rotation of the balls which will be retained in their respective positions when the device is removed from the bearings.

It may be desirable in some cases to initially incline both flanges, and to insert the balls from one side by virtue of a spring action or the resiliency of the metal of which the device is formed, the balls in such case being "snapped" into place, but for greater rigidity, strength and durability, with less liability of permitting the balls to accidentally escape, the swaging or bending of one or both of the flanges after the balls are inserted is preferable.

I thus provide a very simple and efficient device for holding in separated relation a circular series of balls adapted to resist axial pressure or end-thrust, which is comparatively inexpensive in manufacture, and strong and durable in practical use.

Having thus described my invention, what I claim as new and desire to secure by Letters Patent is:

1. A ball retainer for ball bearings consisting of an annular body or plate having flanges extending from its margins in opposite directions and being perforated between its margins to receive the balls, the balls being capable of free rotation in the perforations and being confined therein solely by the flanges at the margins of the plate.

2. A ball retainer for ball bearings consisting of an annular plate having flanges extending in opposite directions from its margins and provided with spaced openings between the flanges to receive balls, the plate extending directly between the flanges at an angle to the radial plane of the same and the flanges being adapted to confine the balls in the openings without preventing free rotation thereof.

3. A ball retainer for ball bearings consisting of an annular plate or ring having spaced openings and plane faces, and annular flanges projecting in opposite directions from the inner and outer edges of the plate, the spaced openings being adapted to receive balls which are confined in said openings solely by engagement with the annular flanges.

4. A ball retaining device for ball bearings consisting of an annular plate having flanges extending in opposite directions from its opposite edges and having spaced openings between said edges adapted to receive balls, the free edges of the flanges being turned toward the plate to engage the balls and thereby retain them in the openings without preventing their free rotation.

5. A ball retaining device for ball bearings consisting of an annular plate having spaced openings therein to receive balls, an annular flange extending from the inner edge of the plate, and an annular flange extending from the outer edge of the plate in a direction opposite to that of the first-mentioned flange, the plate extending on a straight diagonal line across the space between opposite edges of the flanges and the flanges having their free edges turned slightly into the said space to retain the balls in the openings without preventing their free rotation.

In testimony whereof I affix my signature, in presence of two witnesses.

DAVID F. CHAMBERS.

Witnesses:
JACK L. STRAUB,
W. A. FULMER.